United States Patent [19]

Gonda et al.

[11] Patent Number: 5,074,404
[45] Date of Patent: Dec. 24, 1991

[54] VIBRATION ISOLATOR HAVING ADJUSTABILITY FEATURE

[75] Inventors: William V. Gonda, Homer City; David A. Brence, Blairsville; Paul I. Sleppy, Penn Run, all of Pa.

[73] Assignee: FMC Corporation, Chicago, Ill.

[21] Appl. No.: 702,173

[22] Filed: May 15, 1991

[51] Int. Cl.⁵ .............................................. B65G 27/02
[52] U.S. Cl. ..................................... 198/757; 198/760; 198/767
[58] Field of Search ........................ 198/757, 767, 760

[56] References Cited

U.S. PATENT DOCUMENTS

| | | |
|---|---|---|
| 2,333,338 | 11/1943 | Rapp ................................. 198/767 X |
| 2,637,437 | 5/1953 | Jacobsen ............................. 198/757 |
| 3,048,260 | 8/1962 | Willis ................................. 198/757 |
| 3,178,013 | 4/1965 | Hubbard ............................. 198/757 |
| 3,473,759 | 10/1969 | Spiess ................................. 198/757 |

FOREIGN PATENT DOCUMENTS 2511070 9/1976 Fed. Rep. of Germany ...... 198/757

Primary Examiner—Joseph E. Valenza
Assistant Examiner—Cheryl L. Gastineau
Attorney, Agent, or Firm—Douglas W. Rudy; Richard B. Megley

[57] ABSTRACT

An isolator for use on a vibratory parts feeder incorporates a locating plate rotatable through three hundred sixty degrees in a horizontal plain to allow mounting adjustment and parts feeder micro alignment.

5 Claims, 1 Drawing Sheet

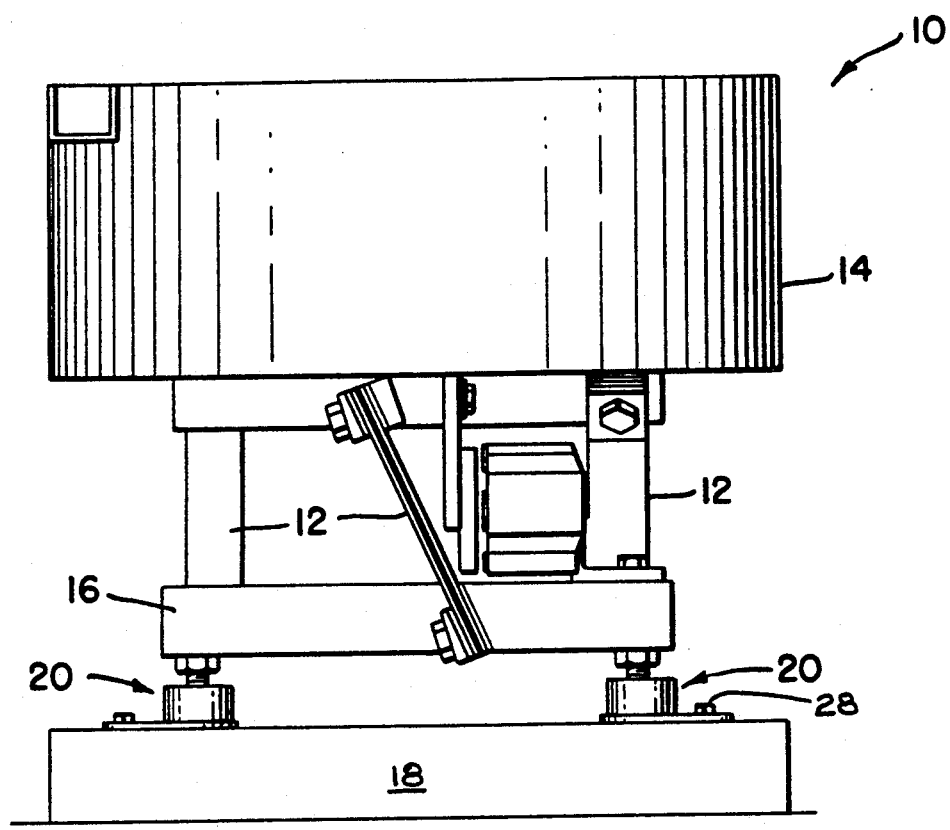
FIG_1
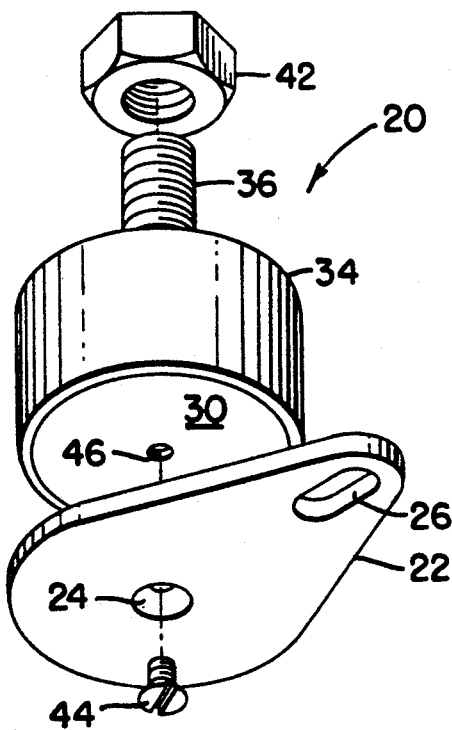
FIG_2
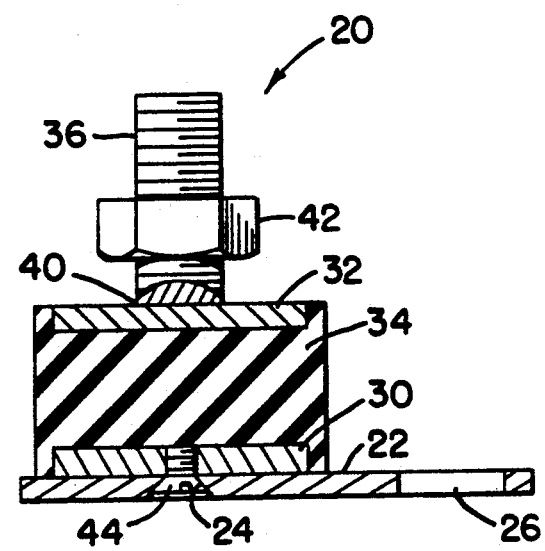
FIG_3

VIBRATION ISOLATOR HAVING ADJUSTABILITY FEATURE

BACKGROUND OF THE INVENTION

1. Field of the Invention

This invention has to do with a vibration isolator that is height adjustable without being moved from its normal installed position in the host equipment. More specifically, a vibration isolator for use with parts handling equipment of the type including a vibratory bowl, a spring system, a vibratory exciter, a parts feeder drive base and a stationary parts feeder support platform is provided. The vibration isolators are mounted between the base of the parts feeder drive and the parts feeder support platform.

It has been found that it is advantageous to provide for small incremental adjustments to adjust the tilt, level or elevation of the base of the parts feeder drive relative to the parts feeder support platform—or other surface to which the base of the parts feeder drive is attached.

It is known to use vibration isolators in this location and environment however the vibration isolators heretofore known have been securely mounted to the parts feeder support platform as well as to the base of the parts feeder drive. This mounting arrangement normally precludes adjustment of the position of the base of the parts feeder drive relative to the parts feeder support platform unless the isolator is disconnected from the support platform and the adjustment then made.

The advantage of the instant invention is that the vibration isolator can be adjusted while firmly attached to the parts feeder support platform so as to increase or decrease the space or gap between the base of the parts feeder drive and the parts feeder support platform.

BRIEF DESCRIPTION OF THE DRAWING FIGURES

In the drawing figures:

FIG. 1 is an elevation view of a vibratory bowl parts feeder;

FIG. 2 is a vibration isolator with some parts expanded away from others;

FIG. 3 is an isolator having portions broken away and the remaining portions sectioned.

DETAILED DESCRIPTION OF THE INVENTION

The invention will be easily understood upon perusal of the drawing figures and a reading of the following description of the best mode of the invention.

The general embodiment of the invention is seen in FIG. 1 wherein a vibratory bowl feeder, generally 10, is shown in elevation. The feeder bowl 14 is supported on springs such as 12 which are part of the conventional parts feeder drive. The parts feeder drive includes a base 16 which is a rather large mass to which the springs 12 are attached.

The entire parts feeder drive is supported on vibration isolators generally 20, of which four would be used in a typical installation as shown. The vibration isolators 20 are fixedly mounted by bolts such as 28 to a parts feeder support platform 18 in a manner as can be best envisioned by looking at FIGS. 2 and 3.

In FIG. 2 all the parts of the vibration isolator of the invention are clearly shown. A locating plate or mounting plate 22 is the element of the vibration isolator that is bolted, by means of fastener 28 for instance, to the support platform 18. The locating plate 22 is provided with an elongated aperture (which could be an aperture of another shape) 26 to allow passage of the bolt 28. A central aperture 24, which is a tapered hole, is provided in the central area of the locating plate and can accommodate a screen fastener such as 44.

The vibration isolator includes an elastomeric main body means 34 which is "sandwiched" between a first metal insert 30 and a second metal insert 32 as clearly seen in FIG. 3. The elastomeric main body means 34 may overlap the edges of the first and second metal inserts as shown in FIG. 3 in order to provide improved security of the bond between the metal inserts and the elastomeric compound.

Attached to the exposed face of the second metal insert, for instance by welding at margin 40, is an upstanding bolt portion 36 which would be threaded to be compatible with threaded holes in the base of the pats feeder drive 16. Carried on the bolt portion 36 is a jam nut or lock type nut 42 which when tightened up against the relative bottom of the base of the parts feeder drive locks the threaded bolt 36 into the base 16 so that the vibration isolator, except for the locating plate 22, is unmovable.

The locating plate 22 will still be movable in a horizontal plane as long as the flat headed screw 44 is not tightly screwed into the threaded aperture 46 formed in the center of the first metal insert. With the screw 44 just snug, but fixed in the aperture 46, the locator plate can be moved relative to the first metal insert 30 and the elastomeric main body means 34.

Once the vibration isolator, generally 20, is mounted between the base of the parts feeder drive and the parts feeder support platform 18 it can allow adjustment of the height of the vibratory bowl feeder through the screwing in or out of the threaded stud 36 into the base of the parts feeder drive. This is accomplished with the lock nut 42 "backed off". The locating plate 22 would be stationary and fixed by the bolt 28 to the support platform 18 while the rest of the vibration isolator could be rotated clockwise or counterclockwise to get the desired height.

It should be pointed out that the locator plate 22 is not separate from the rest of the vibration isolator but is attached loosely enough, in a preferred embodiment, to allow relative movement between the locator plate 22 and first metal insert 30.

After the adjustment is made the lock nut will be tightened against the bottom of the base of the parts feeder drive to prevent further inadvertent movement of the threaded stud relative to the threaded apertures in the base of the parts feeder drive.

Thus it can be seen that there has been disclosed a vibratory isolator that is adjustable after being installed in its normal working environment. Although a preferred embodiment of the invention has been disclosed the appended claims are to be construed to cover equivalents and nuances of design that fairly fall within the scope of the claims.

What is claimed is:

1. In a parts feeder including a drive assembly and a feeder bowl means mounted on said drive assembly, the improvement comprising;

a support platform for supporting said parts feeder drive;

vibration isolators mounted between said parts feeder drive and said support platform, said isolators having horizontally rotatable locating plates on the bottom side of said vibration isolators.

2. The invention in accordance with claim 1 wherein said vibration isolator includes;
- a first metal insert, having a threaded aperture therein;
- an elastomeric main body means bonded to said first metal insert;
- a second metal insert bonded to said elastomeric main body means, said second metal insert including an upstanding bolt portion affixed to said second metal insert;
- vertically adjustable lock nut means threaded on said upstanding bolt portion of said second metal insert.

3. The invention in accordance with claim 2 wherein said locating plate has an extended ear portion provided with a through aperture.

4. The invention in accordance with claim 3 wherein said locating plate defines a central aperture and said central aperture is tapered inwardly.

5. The invention in accordance with claim 4 wherein a flat headed screw having a head shape matching the taper of said central aperture passes through said central aperture into said threaded aperture of said first metal insert.

* * * * *